United States Patent
Garcia Navarro (10) Patent No.: US 10,142,700 B2
(45) Date of Patent: Nov. 27, 2018

(54) TELEVISION SERVICE PROVIDED SOCIAL NETWORKING SERVICE

(71) Applicant: DISH Technologies L.L.C., Englewood, CO (US)

(72) Inventor: Carlos Garcia Navarro, Boulder, CO (US)

(73) Assignee: DISH Technologies L.L.C., Englewood, CO (US)

( * ) Notice: Subject to any disclaimer, the term of this patent is extended or adjusted under 35 U.S.C. 154(b) by 211 days.

(21) Appl. No.: 13/834,916

(22) Filed: Mar. 15, 2013

(65) Prior Publication Data
US 2014/0282779 A1 Sep. 18, 2014

(51) Int. Cl.
| H04N 21/25 | (2011.01) |
| H04N 21/258 | (2011.01) |
| H04N 21/45 | (2011.01) |
| H04N 21/466 | (2011.01) |
| H04N 21/475 | (2011.01) |
| H04N 21/63 | (2011.01) |
| H04N 21/61 | (2011.01) |
| G06Q 50/00 | (2012.01) |
| H04N 21/4788 | (2011.01) |

(Continued)

(52) U.S. Cl.
CPC ......... H04N 21/6175 (2013.01); G06Q 30/02 (2013.01); G06Q 30/0282 (2013.01); G06Q 50/01 (2013.01); H04L 51/32 (2013.01); H04N 21/252 (2013.01); H04N 21/25891 (2013.01); H04N 21/4756 (2013.01); H04N 21/4788 (2013.01)

(58) Field of Classification Search
None
See application file for complete search history.

(56) References Cited

U.S. PATENT DOCUMENTS

| 7,895,625 B1 | 2/2011 | Bryan et al. |
| 8,893,012 B1 | 11/2014 | Zhang et al. |
| 9,288,551 B2 | 3/2016 | Kummer |

(Continued)

FOREIGN PATENT DOCUMENTS

| WO | 2005/029859 A1 | 3/2005 |
| WO | 2009/030775 A1 | 3/2009 |

(Continued)

OTHER PUBLICATIONS

International Search Report and Written Opinion for PCT/US2014/023466 dated Jul. 10, 2014, 15 pages.

(Continued)

*Primary Examiner* — Brian T Pendleton
*Assistant Examiner* — Jean Duclos Saintcyr
(74) *Attorney, Agent, or Firm* — Kilpatrick Townsend & Stockton LLP (57) ABSTRACT

A social network service for use by a television service provider is disclosed. The social network service allows a subscriber to connect and interact with other subscribers based on program ratings or other criteria. The social network service may comprise correlating program ratings of different subscribers of the social network service in order to suggest possible subscribers to join a first subscriber's social network. The social network service may allow for a subscriber or the television service provider to moderate the social network.

20 Claims, 7 Drawing Sheets

(51) Int. Cl.
*H04L 12/58* (2006.01)
*G06Q 30/02* (2012.01)

(56) References Cited

U.S. PATENT DOCUMENTS

| | | | |
|---|---|---|---|
| 9,621,960 B2 | 4/2017 | Hardy et al. | |
| 9,769,540 B2 | 9/2017 | Kummer | |
| 9,912,973 B2 | 3/2018 | Jackson et al. | |
| 2002/0090198 A1 | 7/2002 | Rosenberg et al. | |
| 2003/0154475 A1 | 8/2003 | Rodriguez et al. | |
| 2003/0172376 A1 | 9/2003 | Coffin, III | |
| 2005/0091690 A1 | 4/2005 | Delpuch et al. | |
| 2006/0174277 A1 | 8/2006 | Sezan et al. | |
| 2007/0061830 A1 | 3/2007 | Chang | |
| 2007/0169165 A1 | 7/2007 | Crull et al. | |
| 2007/0199025 A1 | 8/2007 | Angiolillo et al. | |
| 2007/0288951 A1 | 12/2007 | Ray et al. | |
| 2008/0244666 A1 | 10/2008 | Moon et al. | |
| 2008/0244678 A1 | 10/2008 | Kim et al. | |
| 2008/0270038 A1* | 10/2008 | Partovi | G06Q 10/00 702/19 |
| 2009/0210898 A1 | 8/2009 | Childress et al. | |
| 2009/0228911 A1 | 9/2009 | Vrijsen | |
| 2010/0064306 A1 | 3/2010 | Tiongson et al. | |
| 2010/0071007 A1 | 3/2010 | Meijer | |
| 2010/0125864 A1 | 5/2010 | Dwyer et al. | |
| 2010/0146560 A1 | 6/2010 | Bonfrer | |
| 2010/0175085 A1 | 7/2010 | Seol | |
| 2010/0218214 A1 | 8/2010 | Fan et al. | |
| 2010/0242076 A1 | 9/2010 | Potesta et al. | |
| 2010/0272257 A1 | 10/2010 | Beals | |
| 2010/0305729 A1 | 12/2010 | Glitsch et al. | |
| 2011/0055871 A1 | 3/2011 | Bi et al. | |
| 2011/0082858 A1* | 4/2011 | Yu et al. | 707/727 |
| 2011/0173337 A1 | 7/2011 | Walsh et al. | |
| 2011/0191417 A1* | 8/2011 | Rathod | G06Q 30/02 709/204 |
| 2011/0194833 A1 | 8/2011 | Jong | |
| 2011/0295667 A1 | 12/2011 | Butler | |
| 2012/0054148 A1 | 3/2012 | Flinn et al. | |
| 2012/0078953 A1 | 3/2012 | Araya | |
| 2012/0110615 A1 | 5/2012 | Kilar et al. | |
| 2012/0110616 A1 | 5/2012 | Kilar et al. | |
| 2012/0124625 A1* | 5/2012 | Foote | G06F 17/30796 725/42 |
| 2012/0260295 A1 | 10/2012 | Rondeau | |
| 2012/0278834 A1 | 11/2012 | Richardson | |
| 2012/0284745 A1 | 11/2012 | Strong | |
| 2012/0295560 A1 | 11/2012 | Mufti | |
| 2013/0031216 A1* | 1/2013 | Willis | H04L 67/02 709/219 |
| 2013/0060648 A1 | 3/2013 | Maskatia et al. | |
| 2013/0071090 A1 | 3/2013 | Berkowitz et al. | |
| 2013/0268951 A1 | 10/2013 | Wyatt et al. | |
| 2013/0290131 A1 | 10/2013 | Bjork et al. | |
| 2013/0291037 A1* | 10/2013 | Im et al. | 725/109 |
| 2014/0025609 A1 | 1/2014 | Coster et al. | |
| 2014/0068692 A1* | 3/2014 | Archibong | H04L 65/4084 725/116 |
| 2014/0114966 A1* | 4/2014 | Bilinski | G06F 17/30749 707/723 |
| 2014/0150009 A1* | 5/2014 | Sharma | 725/28 |
| 2014/0278308 A1 | 9/2014 | Liu et al. | |
| 2014/0282744 A1 | 9/2014 | Hardy et al. | |
| 2015/0095154 A1 | 4/2015 | Kannan | |
| 2015/0150052 A1* | 5/2015 | Errico | G06F 17/30035 725/46 |
| 2016/0044349 A1 | 2/2016 | Jackson | |

FOREIGN PATENT DOCUMENTS

| | | |
|---|---|---|
| WO | 2011040999 A1 | 4/2011 |
| WO | 2014/072742 A1 | 5/2014 |
| WO | 2014164782 A1 | 10/2014 |

OTHER PUBLICATIONS

International Search Report and Written Opinion for PCT/GB2015/052570 dated Dec. 11, 2015, all pages.
U.S. Appl. No. 14/297,279, filed Jun. 5, 2014 Final Rejection dated Apr. 22, 2016, 33 pages.
U.S. Appl. No. 13/801,932, filed Mar. 13, 2013 Non-Final Rejection dated May 20, 2016, 28 pages.
U.S. Appl. No. 13/801,932, filed Mar. 13, 2013 Non Final Office Action dated Jun. 24, 2015, 21 pages.
U.S. Appl. No. 13/801,932, filed Mar. 13, 2013 Final Office Action dated Dec. 17, 2015, 23 pages.
U.S. Appl. No. 14/297,322, filed Jun. 5, 2014 Notice of Allowance dated Nov. 5, 2015, 34 pages.
U.S. Appl. No. 14/297,279, filed Jun. 5, 2014 Non-Final Office Action dated Nov. 5, 2015, 45 pages.
European Patent Office, European Search Report for EP10153220, dated Jun. 18, 2010, 6 pages.
Pinkston, Tristi, "What is Listmania?", posted on Apr. 17, 2008 on www.familes.com; Retrieved via WayBack Machine on Jan. 4, 2013 from: http://web.archive.org/web/20130104144011/http:www.families.com/blog/what-is-listmania, 2 pages.
International Preliminary Report on Patentability for PCT/US2014/023466 dated Sep. 15, 2015, 9 pages.
U.S. Appl. No. 13/801,932, filed Mar. 13, 2013 Notice of Allowance dated Nov. 25, 2016, all pages.
U.S. Appl. No. 14/297,279, filed Jun. 5, 2014 Non-Final Office Action dated Feb. 9, 2017, all pages.
U.S. Appl. No. 14/297,279, filed Jun. 5, 2014 Notice of Allowance dated May 19, 2017, all pages.
U.S. Appl. No. 15/182,404, filed Jun. 14, 2016, Non-Final Rejection dated Jul. 20, 2017, all pages.
U.S. Appl. No. 14/454,488, filed Aug. 7, 2014, Final Rejection dated May 26, 2016, all pages.
U.S. Appl. No. 14/454,488, filed Aug. 7, 2014, Non-Final Rejection dated Sep. 20, 2016, all pages.
U.S. Appl. No. 14/454,488, filed Aug. 7, 2014, Final Rejection dated Feb. 6, 2017, all pages.
U.S. Appl. No. 14/454,488, filed Aug. 7, 2014, Notice of Allowance dated Jun. 30, 2017, all pages.
U.S. Appl. No. 15/182,404, filed Jun. 14, 2016, Final Rejection dated Jan. 9, 2018, all pages.

\* cited by examiner

TELEVISION SERVICE PROVIDED SOCIAL NETWORKING SERVICE

BACKGROUND

Providers of video content and data services include terrestrial broadcasters, satellite broadcasters, cable broadcasters, and others. Such providers typically have users, who may subscribe for various services offered by the providers. Further, there are often groups of the users who have the same interests and preferences. It may be beneficial to allow such groups of users to further voluntarily self-associate on the basis of common interests and content preferences.

SUMMARY

This Summary does not in any way limit the scope of the claimed subject matter.

One embodiment is of a system for providing a social networking system (SNS) by a television service provider (TSP), the system comprising one or more processors, and non-transitory storage media communicatively coupled with and readable by the one or more processors. The storage media comprises instructions, which when executed by the one or more processors, cause the one or more processors to receive a communication from a first subscriber of the SNS, wherein the communication includes search parameters to be used to perform a correlation of program ratings of the first subscriber and a plurality of other subscribers of the SNS, correlate the program ratings of the first subscriber with the program ratings of the plurality of other subscribers using the search parameters included in the communication received from the first subscriber, generate a candidate member list for the first subscriber wherein the candidate member list comprises information of a subset of the plurality of other subscribers, and the subset of other subscribers is based on the correlation of the program ratings, and cause the candidate member list to be transmitted to a least one transmitter-receiver (TR) associated with the first subscriber.

Another embodiment is for a method for providing a social networking service (SNS) by a television service provider (TSP), the method comprising: receiving a communication from a first subscriber of the wherein the communication includes search parameters to be used to perform a correlation of the program ratings of the first subscriber and a plurality of other subscribers of the SNS; correlating the program ratings of the first subscriber with program ratings of the plurality of other subscribers of the SNS using the search parameters included in the communication received from the first subscriber; generating a candidate member list for the first subscriber, wherein the candidate member list comprises information of a subset of the plurality of other subscribers, and the subset of the plurality of other subscribers is based on the correlation of the program ratings; and transmitting the candidate member list to at least one transmitter-receiver (TR) associated with the first subscriber.

Another embodiment is of a computer program product embodied on a computer-readable medium and comprising code that, when executed, causes one or more processors of a television service provider (TSP) to: provide a social networking service (SNS) to subscribers; receive a communication from a first subscriber of the SNS comprising search parameters to be used to perform a correlation of program ratings of the first subscriber and a plurality of other subscribers; correlate the program ratings of the first subscriber with the program ratings of the plurality of other subscribers of the SNS using the search parameters included in the communication received from the first subscriber; generate a candidate member list for the first subscriber comprising information of a subset of the plurality of other subscribers, wherein the subset of the plurality of other subscribers is based on the correlation of the program ratings; and transmit the candidate member list to at least one transmitter-receiver associated with the first subscriber.

DESCRIPTION OF THE DRAWINGS

A further understanding of the nature and advantages of various embodiments may be realized by reference to the following figures. The following figures illustrate exemplary embodiments only to help understand the disclosure given in the Detailed Description, and are not intended to illustrate limitations of the embodiments.

In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

As a convenience, a non-exhaustive list of acronyms used herein is provided. The detailed meaning of each acronym or term is given in subsequent paragraphs.

DSL Digital Subscriber Line
EPG Electronic Programming Guide
SNS Social Network Service
STB Set Top Box
TR Transmitter-Receiver
TSP Television Service Provider Video programming and data services are often transmitted by an entity, called herein a television service provider (TSP), to users of the services. Examples of video programming comprise television shows, movies, music videos and other image data. The term program will refer herein to either a particular instance of such video programming, or to a group of such instances. For example, the term program may refer to one episode of a TV series, or to the series itself. Examples of data services comprise data backup services, automatic bill payment, recommendations of programming, and personal programming recording and storage. Other video programming and data services are possible. Users of the services are often separated and unknown to each other. Yet there may be subgroups of users who have similar video programming preferences and related interests, and who might possibly enjoy being able to communicate with each other.

Social networking refers generally to ways by which people with a common interest or interests are able to interact, communicate, and form groups, sometimes without needing to meet physically. This is often accomplished by electronic communication systems, such as email, cellphone messaging, texting, internet linking and other means.

In some embodiments a TSP may include a system to provide social network services (SNS) to users who choose to participate, hereinafter called subscribers. The SNS system is able to record program ratings submitted by subscribers, correlate program ratings of the subscribers, generate a candidate member list of other subscribers with whom a first subscriber might wish to form a social network, and cause the candidate member list to be transmitted to the first subscriber. In some embodiments, in the case that the subscriber wishes to form a social network, the SNS may then perform social networking services, such as relaying messages between social network members, maintaining electronic bulletin boards, and similar electronic information storage and transmission.

In some embodiments, the program ratings of subscribers may be organized by categories such as genre, favorite actor, or television series. Other categories may be used. The subscribers may be able to edit and organize the categories in their respective program ratings. The SNS system may base its correlation of program ratings using information in one or more of the categories used by subscribers.

In some embodiments the TSP receives and relays to the SNS a communication from a first subscriber containing a request to establish a social network to be associated with the first subscriber. Upon receipt of such a request from a valid subscriber, the SNS reserves space in a storage media for storing files, other information, programs, user interfaces and other necessary elements to perform social network hosting services. The communication from the first subscriber to the SNS system requesting the establishment of a social network may also include program ratings of the first subscriber. The program ratings may be a searchable list of content that the first subscriber has ranked by favorability. The program ratings of the first subscriber may also be communicated to the SNS separately from the communication requesting the establishment of a social network.

In some embodiments, the first subscriber may communicate a request to the SNS system to perform a correlation of the first subscriber's program ratings with the program ratings of at least one other SNS subscriber, and to generate for the first subscriber a candidate member list.

In some embodiments, once a first subscriber has received a candidate member list, the first subscriber may communicate to the SNS system an invitee member list comprising information of subscribers included on the candidate member list. Thereafter the SNS system causes an invite-to-join message to be transmitted to a subset of subscribers on the invitee member list. Subscribers receiving an invite-to-join message may choose to be added to the social network of the first subscriber, or may choose not to. In the former case, a second subscriber choosing to be added may be granted access to the information in the social network of the first subscriber. The access may allow the second subscriber to post information to the social network and to interact with other subscribers that have been added to the social network by communicating through the TSP. Also, subscribers with access to the social network may share information such as their program ratings.

In the case that a subscriber chooses not to be added to the first subscriber's social network, the subscriber choosing not to be added may have some or all access denied to the information, communications and other social network services provided by the SNS system for the social network of the first subscriber.

In some embodiments, a member of a subscriber's social network may withdraw from the social network by so requesting. The first subscriber, to whom the social network is associated, may perform social network maintenance or monitoring. Examples of social network maintenance or monitoring actions comprise removing or updating postings and if necessary removing other members from the social network. The SNS system may also be configured to perform social network maintenance and monitoring actions.

In some embodiments, the first subscriber may transmit to the SNS system a request to re-correlate its own program ratings with those of other subscribers and generate a new candidate member list.

Figure 1:
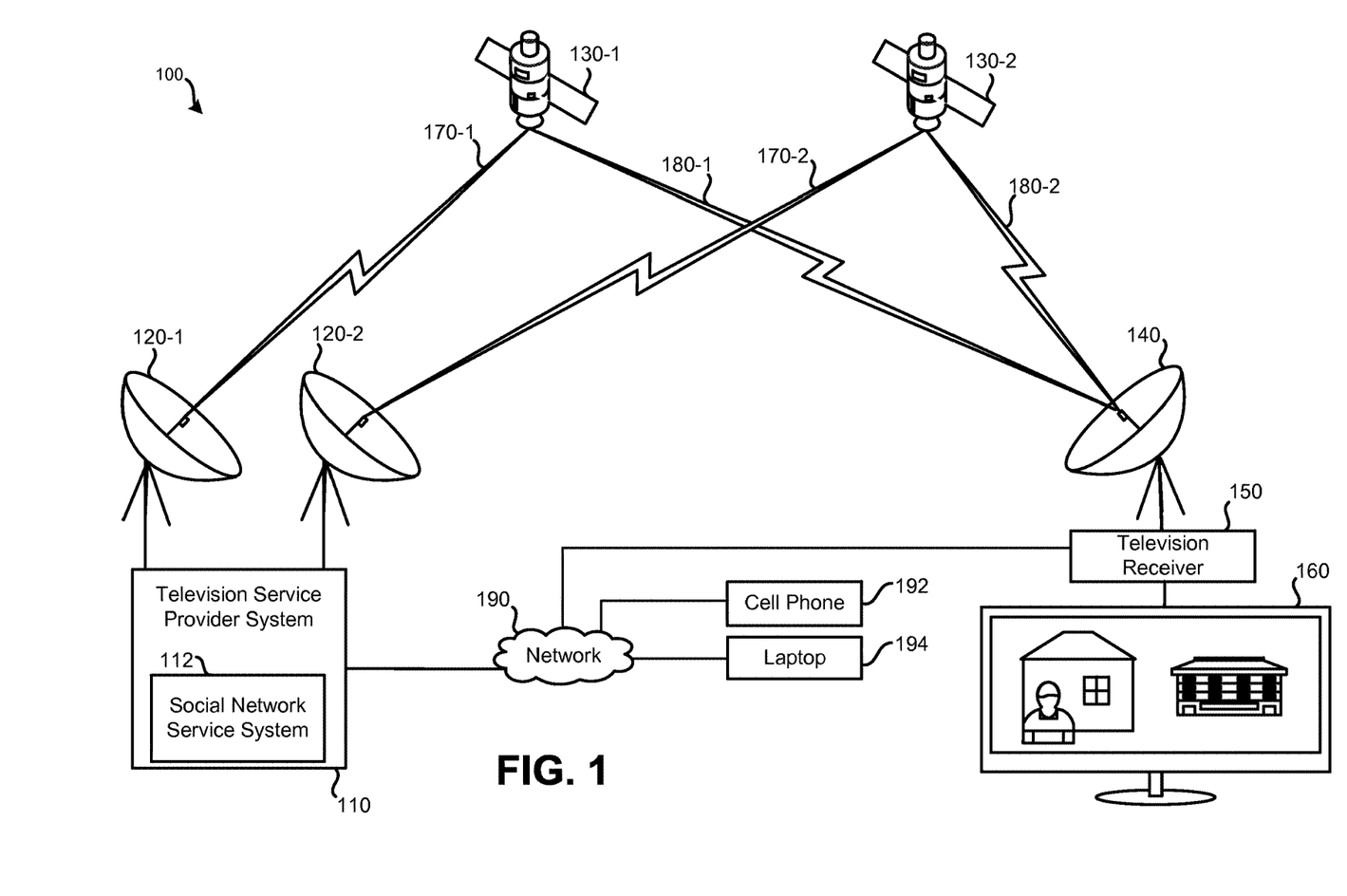
FIG. 1 illustrates an embodiment of a system used by a Television Service Provider (TSP) to deliver video programming to a Television Receiver and to host a Social Networking System (SNS) for a subscriber of the TSP, and to receive signals from a subscriber.

FIG. 1 illustrates an embodiment of a system by which a TSP may provide a social network service. The exemplary system 100 comprises a television service provider system 110 which transmits video and other content signals to a television receiver 150 of at least one television 160. The transmission link in this exemplary embodiment is by satellite communications 170-1, 180-1, 170-2 and 180-2. Alternative and additional embodiments of transmission links by which a TSP communicates comprise cable, internet, and DSL. The TSP system 110 comprises an SNS system 112, which may comprise equipment and instructions for its operation.

The satellite television distribution system 100 may include: satellite transmitter equipment 120, satellites 130, satellite dish 140, television receiver 150, and television 160. Alternate embodiments of satellite television distribution system 100 may include fewer or greater numbers of components. While only one satellite dish 140, television receiver 150, and television 160 (collectively referred to as "user equipment") are illustrated, it should be understood that multiple (e.g., tens, thousands, millions) instances of user equipment may receive television signals from satellites 130.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal paths between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a time.

In communication with satellite dish 140 may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of television receiver 150. As such, television receiver 150 may decode signals received via satellite dish 140 and provide an output to television 160. A television receiver is defined to include set-top boxes (STBs) and also circuitry having similar functionality that may be incorporated with another device. For instance, circuitry similar to that of a television receiver may be incorporated into a television. As such, while FIG. 1 illustrates an embodiment of television receiver 150 as separate from television 160, it should be understood that, in other embodiments, similar functions may be performed by a television receiver integrated with television 160.

Television 160 may be used to present video and/or audio decoded by television receiver 150. Television receiver 150 may also output a display of one or more interfaces to television 160, such as an electronic programming guide (EPG). In some embodiments, a display device other than a television may be used.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. Television receiver 150 may decode the received transponder stream. As such, depending on which television channel(s) are desired, a transponder stream from a different satellite (or a different transponder of the same satellite) may be accessed and decoded by television receiver 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and television receiver 150. Via such a secondary communication channel, bidirectional exchange of data may occur. As such, data may be transmitted to television service provider system 110 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190. In some embodiments alternative devices other than a television receiver may be used to access network 190. Examples of such alternative devices comprise a cellphone 192 and a laptop computer 194. Other alternative devices are apparent to one skilled in the art.

FIG. 1 illustrates an example of a satellite-based television channel distribution system. It should be understood that at least some of the aspects of such a system may be similar to a cable or DSL television distribution system. For example, in a cable or DSL television system, rather than using satellite transponders, multiple RF channels on a cable or landline may be used to transmit streams of television channels. It should also be understood that the network 190 in such a cable or DSL system may use the same cable or landline connection. As such, aspects detailed herein may be applicable to cable or DSL television distribution systems.

Figure 2:
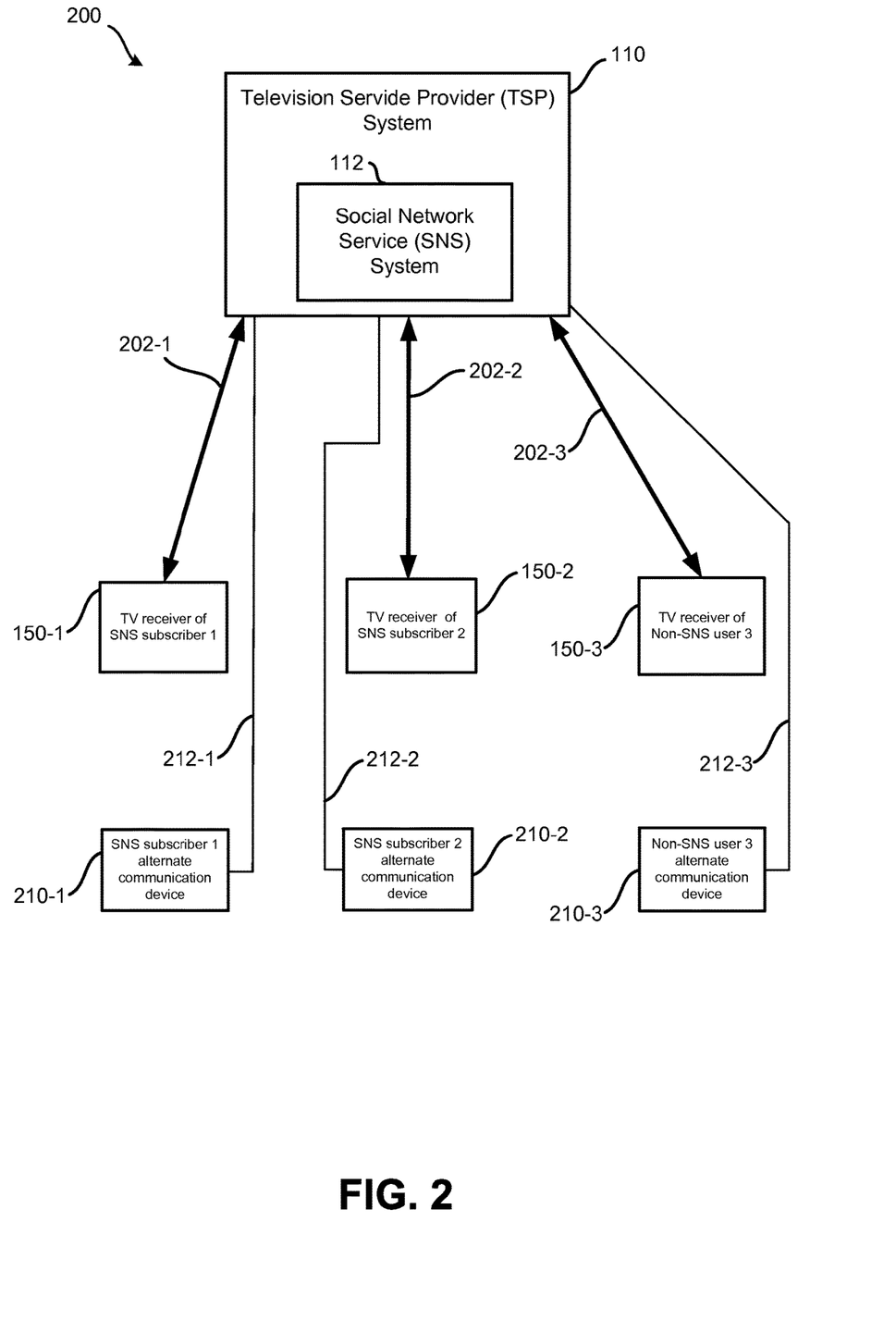
FIG. 2 illustrates an embodiment of the Social Networking Hosting system of a TSP with a plurality of users.

FIG. 2 illustrates an exemplary embodiment 200 in which a TSP 110 is configured to provide a social network service 112 to a plurality of users associated with the TSP. It is to be understood that, though only three TV receivers are shown, there may be any number of such receivers. In the exemplary embodiment each user associated with the TSP has a primary communication link 202 with the TSP. The example also illustrates a non-primary link 212 by which an alternate communication device 210 of a user associated with the TSP is able to communicate with the TSP. In the embodiment illustrated in FIG. 1 the primary link is the satellite link 170 and 180, in which the television receiver may use the network link 190. Examples of alternate communication devices 210 comprise cellphones, computers such as laptops or desktops, and other examples as would be known to one of skill in the art. The alternate communication devices may be unidirectional or bidirectional, and may communicate with the TSP over the network 190.

The term transmitter-receiver (TR) will denote herein either a TV receiver 150 or an alternate communication device, such as a cellphone 192 or a laptop 194, that is capable of at least one of receiving communications from the TSP and transmitting communications to the TSP.

In some embodiments, not all users associated with the TSP may make use of the SNS offered by the TSP. In some embodiments this may occur because a user chooses not to make use of the SNS. The term subscriber refers herein to a user of the TSP who chooses to make use of the SNS. The term SNS subscriber may also be used herein to refer to a user of the TSP who chooses to use the SNS.

Figure 3:
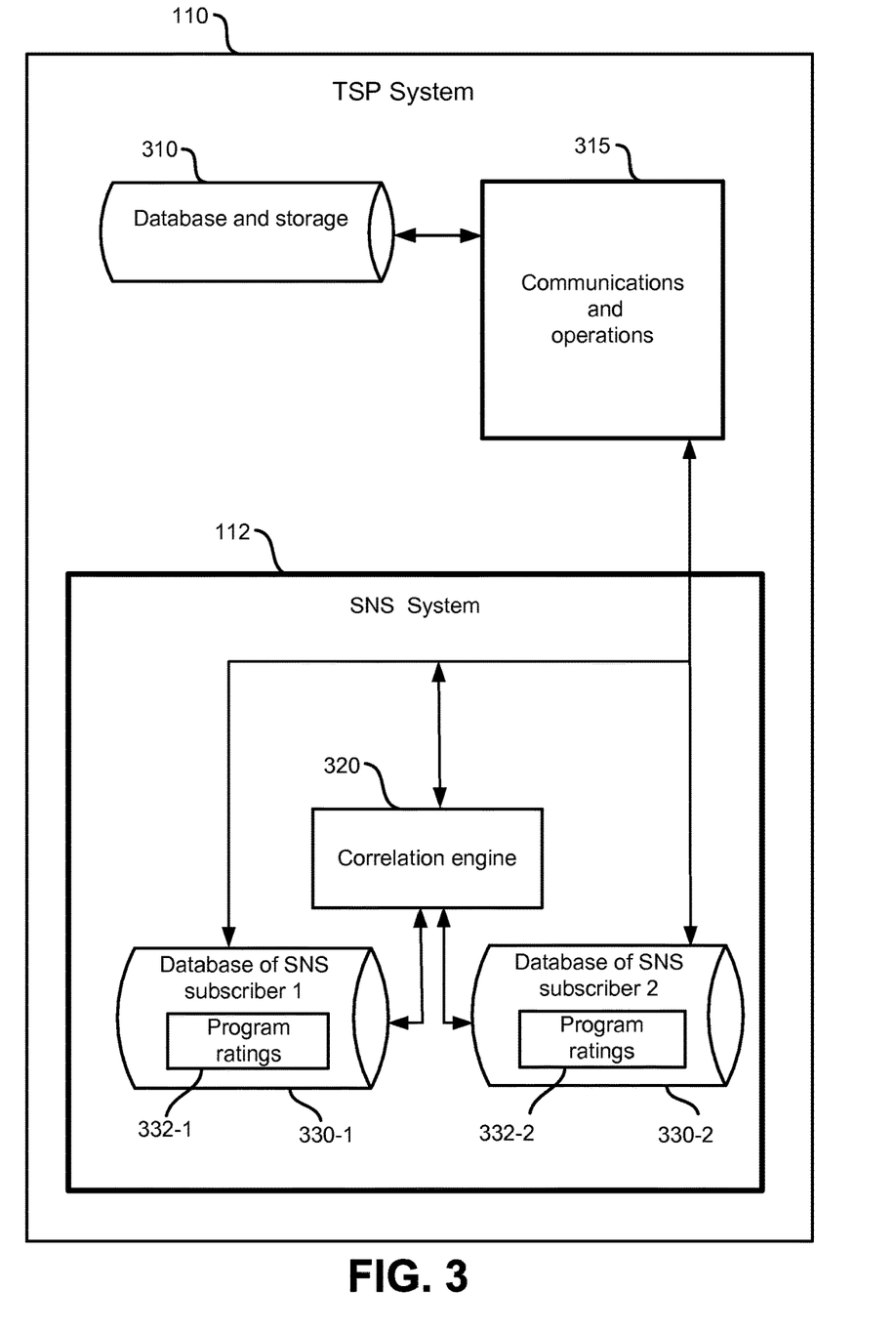
FIG. 3 illustrates an embodiment of an organization of the SNS within the overall TSP system.

FIG. 3 illustrates an exemplary embodiment of a TSP system 110 that also comprises an SNS system 112. The elements of the TSP system may be joined as one device, or may be implemented by physically separated devices linked by any of a variety of communication technologies. The TSP system comprises at least one database and storage 310 for maintaining programming content and information related to the content. Exemplary components of the database and storage comprise magnetic disks, electronic memory and tape memory. The database and storage 310 may comprise a computer system for organizing and retrieving the content and information. The TSP may also comprise a subsystem for communications and operations 315, which may be communicatively coupled to the database and storage 310. In some embodiments, the communications and operations subsystem may coordinate or implement the tasks necessary for transmitting programs or content maintained in the database and storage 310 to users and for processing communications to or from users.

In the embodiment shown in FIG. 3 the communications and operations subsystem 315 is also communicatively linked with an SNS system 112. This communication link may be by any of a variety of communication technologies. The SNS system may comprise a database 330 which may be used for storage of information of a social network associated with an SNS subscriber. Though only two subscriber databases are illustrated within the SNS system in FIG. 3, it is to be understood that there may be any number of databases associated with any number of subscribers. In some embodiments an SNS may provide more than one database for a single subscriber. A database for a subscriber may be maintained on any of a variety of storage media.

In some embodiments the SNS system may be configured to establish a social network associated with a first subscriber. A social network refers to a database to which at least one other subscriber may have access. A social network may comprise electronic bulletin boards, emails, files, lists of program ratings, and other information. In some embodiments of the SNS system, access by another subscriber to a social network associated to a first subscriber may be granted only by the first subscriber. The term member herein refers to a subscriber who has access to a social network. In some embodiments access may be granted only for subsets of information in the social network. Access may be password controlled.

In some embodiments, the SNS system performs social network hosting services for a social network. Social network hosting services may comprise establishing a social network and associating it with a first subscriber; receiving, storing and backing up of information in the social network; relaying of messages between members of the social network; and providing information to members of the social network. Other services may also be provided by the SNS system.

In some embodiments, social network hosting services provided by the SNS system do not transmit personal identifying information of a member from becoming known to any other member, unless the member chooses to have such personal information made known to other members. The SNS may relay messages from a first member to a second member in which the first member voluntarily gives personal identifying information to the second member.

In some embodiments, a social network associated with a first subscriber comprises program ratings 322-1 of the first subscriber. This may be a list comprising TV shows, movies, music or other programming content. The program ratings may comprise information relating to content stored in the database 310 of the TSP or programs from other sources. The program ratings may be based on a binary ranking structure such as like/no opinion, a 3-level ranking such as like/no opinion/dislike, or on a finer ranking structure, such as a 5-star ranking. In some ranking structures, the ranking may be configured so the first subscriber can record degrees of dislike or how unfavorable a program is found to be.

In some embodiments, program ratings may be organized by categories of programs. Examples of categories that may be used for the program ratings comprise genre of program, actor or actress, year of program, and others, as would be clear to one of ordinary skill in the art. In some embodiments, the first subscriber can create a category or categories within the program ratings. In some embodiments the SNS may establish a default set of categories which a subscriber may choose to use or modify.

In some embodiments the program ratings of the social network associated to a first subscriber may be edited by the first subscriber by using an electronic programming interface, such as a television remote control, or through the television receiver or by at least one alternate communication device 210. The program ratings may be stored so that the content and the respective ratings of the content are searchable by a computer system.

The SNS system may comprise a correlation engine 320 configured to determine a degree of similarity between the program ratings 332-1 of a first subscriber with program ratings of at least one other subscriber 332-2. The term correlation is used herein to refer to the degree of similarity. The correlation engine may be implemented through a computer system such as one shown in FIG. 7 and which is disclosed in subsequent paragraphs. The correlation engine may also make use of information or received instructions which specify search parameters to be used to determine a correlation. Examples of such search parameters comprise the amount of correlation and the choice of categories that are to be used in making a correlation. An illustrative example of such criteria is for the program ratings of a first and a second subscriber to have 6 or more common movies in a comedy genre.

In some embodiments the correlation engine may use a direct intersection-based method for determining a correlation of program rankings of subscribers. For example, the correlation engine could determine that a correlation exists if the respective program rankings of two subscribers have at least a certain number of programs in common overall. As a second illustrative example, a correlation would exist if the program rankings were found to have at least the same number of common programs within one or more categories common to both subscribers. In a third example, a correlation would be determined to exist if the program rankings had at least a certain number of common categories per se, such as a dark comedy category together with a horror category.

In some embodiments the correlation engine may use a weighted intersection-based method. Such an embodiment would use a multi-level correlation for a program common to the respective program ratings of a first and second subscriber. As an illustrative example, if both the program ratings of the first and second subscriber had a movie in common, with ratings ranging in integer steps from −3 ("greatly dislike") to 3 ("greatly like"), the correlation engine would use the values as weights to determine a degree of correlation. One example would be the sum of the two ratings, or the absolute value thereof. Another example would use the product of the ratings. The total of such values could be used by the correlation engine to determine that a correlation exists. In another illustrative example a weighted intersection-based method could use as search parameters a requirement that the number of programs in common to both program ratings which are "greatly liked" exceeds a specified number. Other variations would be clear to one of ordinary skill in the art.

In some embodiments the correlation engine 320 is communicatively linked to the communications and operations subsystem 315 in order to communicate correlation information to subscribers.

Figure 4:
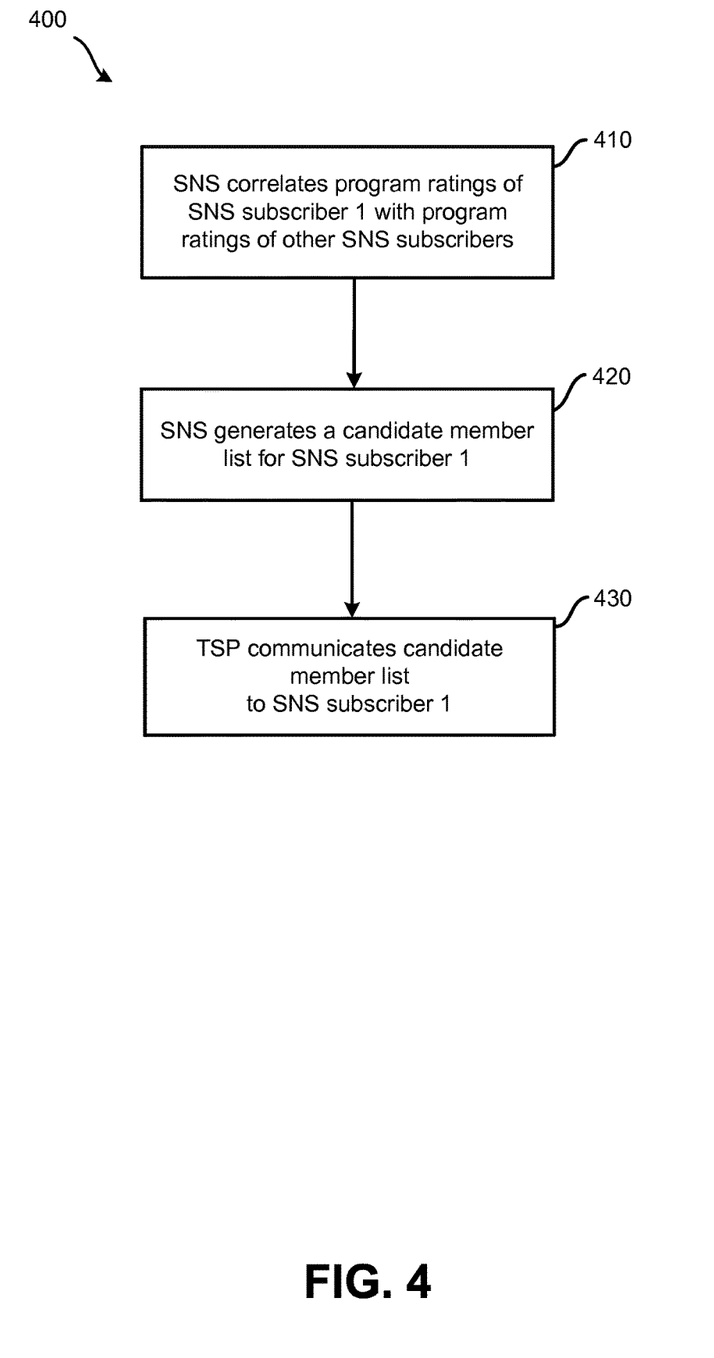
FIG. 4 illustrates an embodiment of an operational flow by which the TSP facilitates social networking among subscribers.

FIG. 4 illustrates an embodiment of a method 400 that an SNS system 112 of a TSP 110 may perform to assist a first subscriber in establishing a social network. The steps may also be used by the SNS after the social network has been established for the first subscriber to allow updating of the social network. The correlation engine 320 of the SNS performs a correlation 410 of the program ratings of a first subscriber with the program ratings of other subscribers. The performance of a correlation may be in response to a message received from the first subscriber for the correlation to be performed. In some embodiments a correlation of program ratings is performed at given time intervals. The degree of correlation and which criteria are to be used in the correlation may be input to the correlation engine through a communication received by the TSP from the first subscriber and communicated to the correlation engine through the SNS system.

In the embodiment shown in FIG. 4 the SNS generates 420 for the first subscriber a candidate member list. The candidate member list comprises information about other subscribers whose program ratings were determined to be correlated with the program ratings of the first subscriber as determined by the criteria used by the correlation engine. Examples of information that may be included in the candidate member list comprise the degree of correlation, the correlation within various categories of program ratings, program ratings of the candidate members on the candidate member list, and other information that would be helpful for the first subscriber to decide to invite a candidate member to join the social network of the first subscriber.

In some preferred embodiments, no personal identifying information is included in the candidate member list. Examples of such excluded information comprise names, email addresses, other addresses, or phone numbers of candidate members on the candidate member list. In some embodiments the SNS uses only anonymous pseudonyms for candidate members of the candidate member list.

In some embodiments, the candidate member list may be empty, such as when the correlation criteria used by the correlation engine were so narrowly set that no other subscriber's program ratings were found to be correlated with the program ratings of the first subscriber.

In the embodiment shown in FIG. 4 the TSP communicates 430 the candidate member list to the first subscriber. The communication may be by a primary communication link 202 or by means of an alternate communication device 212.

Figure 5:
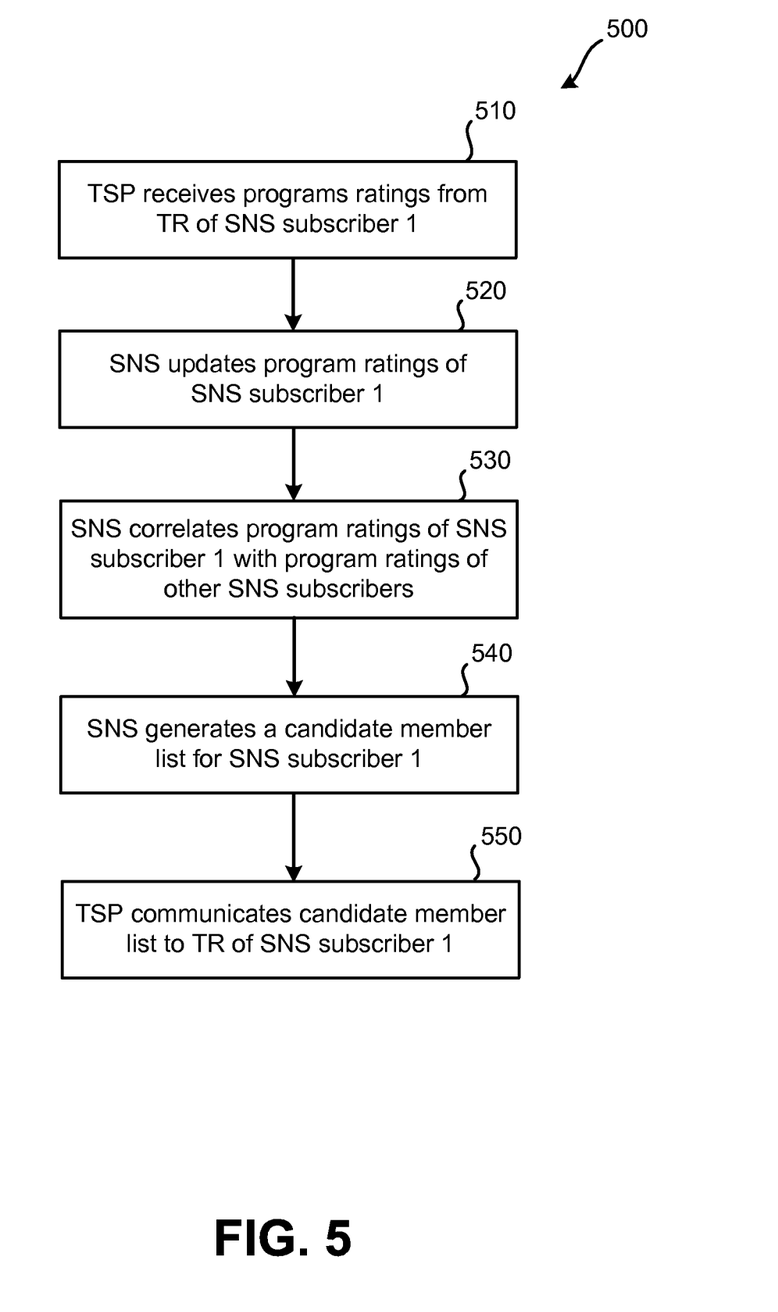
FIG. 5 illustrates an embodiment of an operational flow by which the TSP facilitates social networking among subscribers.

FIG. 5 illustrates an embodiment of a method 500 used by a TSP 110 comprising an SNS system to assist a first subscriber in establishing a social network. The steps may also be used by the SNS after the social network has been established for the first subscriber to allow updating of the social network.

In the embodiment shown in FIG. 5 a TSP 112 receives a communication 510 from a TR of a first subscriber which comprises program ratings of the first subscriber. The communication may further comprise an instruction to update the first subscriber's program ratings 332-1. Updating the program ratings includes the case of creating initial program ratings for the first subscriber. In some embodiments, upon reception of a communication from the first subscriber containing program ratings, the TSP automatically communicates an update message to the SNS system and the SNS system records 520 the updated information in the first subscriber's program ratings 332-1.

In some embodiments the update message to the SNS system may cause the SNS system to use correlation engine 320 to perform a correlation 530 of the updated program ratings of the first subscriber with the program ratings of other subscribers.

On the basis of the correlation the SNS system generates 540 a candidate member list for the first subscriber. The candidate member list comprises information about other subscribers whose program ratings were determined to be correlated with the program ratings of the first subscriber as determined by the criteria used by the correlation engine. Examples of information that may be included in the candidate member list comprise the degree of correlation, the correlation within various categories of program ratings, program ratings of the candidate members on the candidate member list, and other information that would be helpful for the first subscriber to decide to invite a candidate member to join the social network of the first subscriber.

In some preferred embodiments, no personal identifying information is included in the candidate member list. Examples of such excluded information comprise names, email addresses, other addresses, or phone numbers of candidate members on the candidate member list. In some embodiments the SNS uses only anonymous pseudonyms for candidate members of the candidate member list.

In some embodiments, the candidate member list may be empty, such as when the correlation criteria used by the correlation engine were so narrowly set that no other subscriber's program ratings were found to be correlated with the program ratings of the first subscriber.

The candidate member list is thereafter communicated 550 to a TR of the first subscriber. The communication may be by a primary communication link 202 or by means of an alternate communication device 212.

Figure 6:
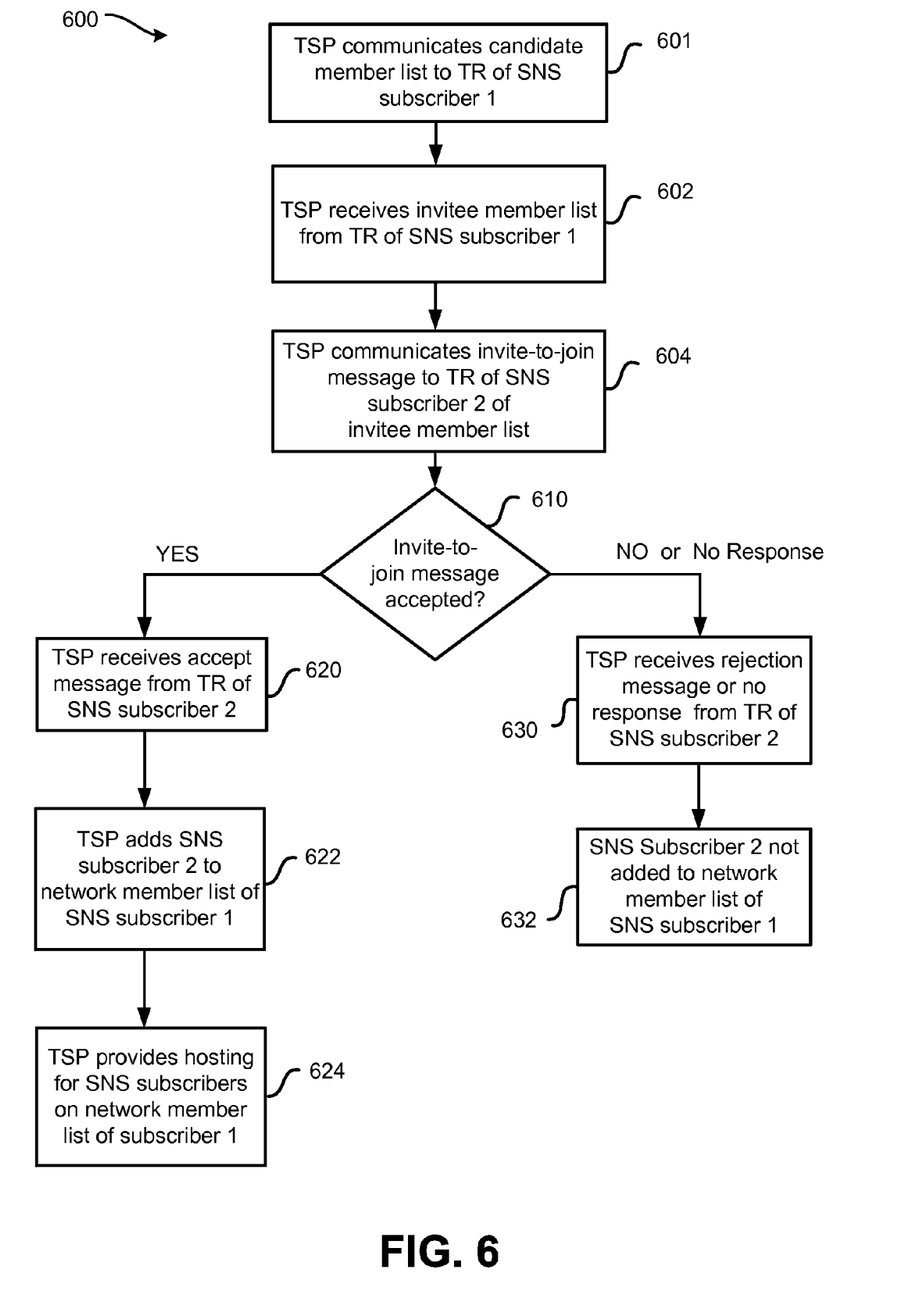
FIG. 6 illustrates an embodiment of an operational flow by which the TSP maintains a Network Member List of a subscriber.

FIG. 6 illustrates an embodiment of a method that an SNS system of a TSP may use as part of social network hosting services for a social network associated to a first subscriber. Once the SNS has generated a candidate member list for the first subscriber, the TSP communicates 601 the candidate member list to a TR of the first subscriber. This communication may be by means of the primary communication link 202 between the TSP and the first subscriber, or by means of an alternate communication link 212.

After receiving the candidate member list, in some embodiments the first subscriber may form an invitee member list using information about other SNS subscribers that is given in the candidate member list. The invitee member list comprises information about other subscribers whom the first subscriber would like to have join the first subscriber's social network. The invitee member list may then be communicated by means of a communication link from the first subscriber and the TSP, and the TSP then receives the invitee member list 602.

After reception of the invitee member list from the first subscriber, in some embodiments the TSP communicates an invite-to-join message 604 to a TR associated with a second subscriber on the invitee member list. In some embodiments, the TSP communicates an invite-to-join message to a TR each subscriber on the invitee member list. In additional or alternate embodiments the TSP may select a subset of the subscribers on the invitee member list using various criteria, such as preferences or updated subscriber status from one or more members of the invitee member list.

Having communicated an invite-to-join message to a TR associated with a second subscriber, in some embodiments the TSP may either receive a reply message from the TR associated with the second subscriber, or within a certain period of time receive no reply 610.

In a first case of such embodiments the TSP may receive a rejection message from the TR associated with the second subscriber which contains information that the second subscriber does not wish to be in the social network of the first subscriber 630. Or in a second case after a period of time without having received any reply from a TR associated with the second subscriber, the TSP may consider the lack of a received reply as equivalent to having received a rejection message from the TR associated with the second subscriber. In either a first or a second case the TSP does not add information 632 about the second subscriber to the network member list of the first subscriber. In preferred embodiments the TSP will not provide any hosting services provided for the social network of the first subscriber to the second subscriber. Examples of services that would not be provided comprise relaying messages between a TR associated with the first subscriber and a TR associated with the second subscriber, posting files received by the TSP from a TR associated with the second subscriber to the social network of the first subscriber, or allowing a TR associated with the second subscriber to receive communications or files from the social network of the first subscriber.

In additional and alternative embodiments, the TSP will not communicate further invite-to-join messages for the social network of the first subscriber to a TR associated with the second subscriber, for an established period of time. In some embodiments the established period of time may be communicated to the TSP by a TR associated with the second subscriber. The period of time may be set as permanent, until changed by a message received by the TSP from a TR associated with the second subscriber.

In additional or alternative embodiments the TSP may receive 620 a message from a TR associated with a first subscriber that no invite-to-join messages for social networks of other subscribers are to be transmitted by the TSP to a TR associated with the first subscriber.

In a third case the TSP may receive an accept message from a TR associated with the second subscriber comprising information that information about the second subscriber may be added to the social network of the first subscriber. The TSP then adds 622 the information about the second subscriber to the social network of the first subscriber and provides 624 to the second subscriber the social network services provided for the social network of the first subscriber.

In additional or alternative embodiments as part of hosting the social network of the first subscriber, the TSP is configured to receive a withdraw message from the TR associated with a second subscriber, the second subscriber being in the social network of the first subscriber, giving information that the second subscriber is to be removed from the social network of the first subscriber. Upon receipt of a withdraw message the TSP will not provide any hosting services provided for the social network of the first subscriber to the second subscriber.

In additional or alternative embodiments, as part of hosting the social network of the first subscriber, the TSP is configured to receive a remove message from the TR associated with the first subscriber giving information that a second subscriber is to be removed from the social network of the first subscriber. Upon receipt of a remove message the TSP will not provide any hosting services provided for the social network of the first subscriber to the second subscriber.

In additional or alternative embodiments as part of hosting the social network of a first subscriber, the TSP is configured to monitor content of the social network. In further embodiments, the TSP is configured to cease providing social network hosting services for the first subscriber and/or eliminate all content of the social network from any storage at the TSP.

Figure 7:
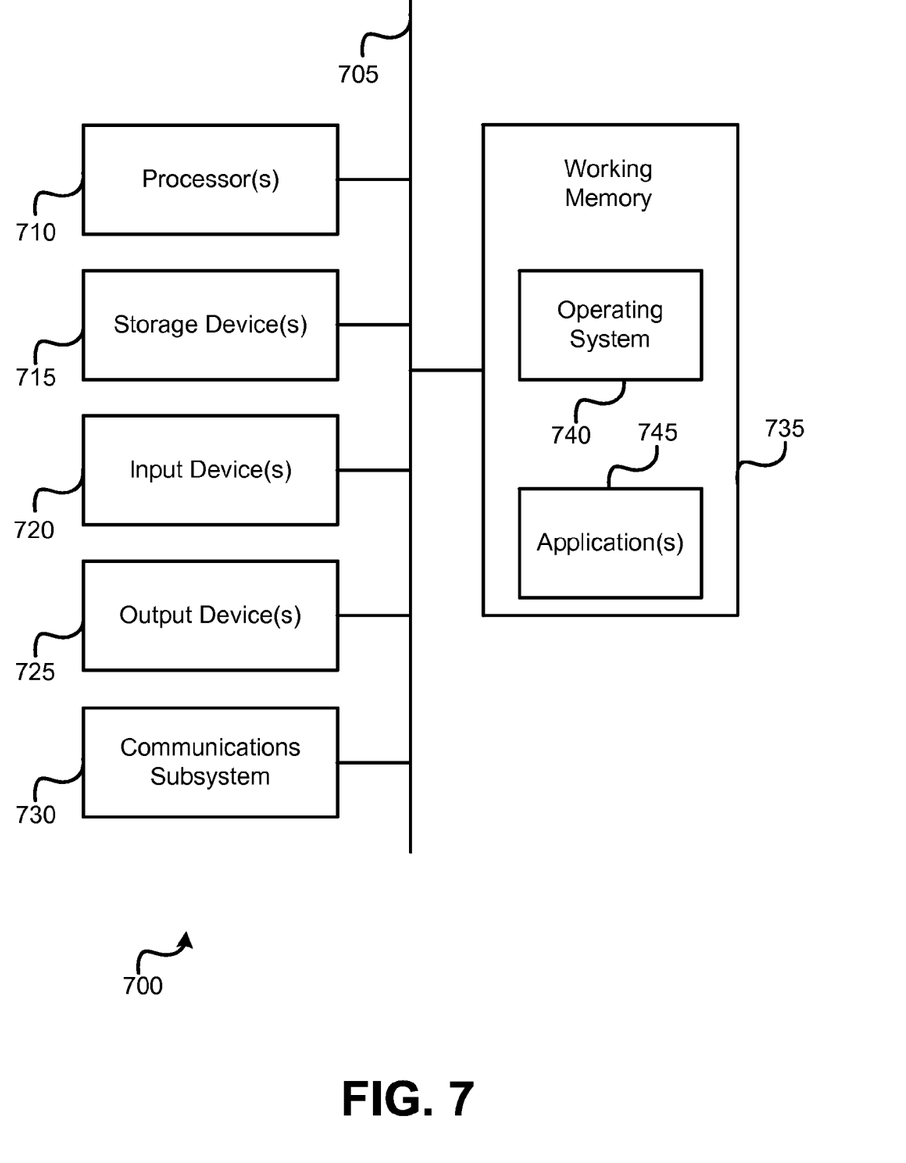
FIG. 7 illustrates a computer system for use by the TSP or the TR of a subscriber to implement the Social Networking system.

A computer system as illustrated in FIG. 7 may be incorporated as part of the previously described elements of a TSP system and an SNS system. For example, computer system 700 can represent some of the components of the television receivers, satellite television distribution system, the communications and operations subsystem of a TSP system, the correlation engine of an SNS system, or social network of a subscriber. FIG. 7 provides a schematic illustration of one embodiment of a computer system 700 that can perform steps of the methods. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed.

In the description above and the claims that follow, the word "a" or "an" preceding an element does not exclude the presence of a plurality of such elements.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A system for providing a social networking service by a television service provider, the system comprising:
   a service provider system interfacing with a network and comprising:
   one or more processors; and
   non-transitory storage media communicatively coupled with and readable by the one or more processors and comprising instructions, which when executed by the one or more processors, cause the one or more processors to:
   process information enabling digital identification of a first subscriber of the social networking service;
   process a set of indications of program ratings of a plurality of television programs, the set of indications being received, via the network, from a first media device associated with the first subscriber and consequent to one or more selections of a first set of user-selectable options to rate the plurality of television programs provided with a television receiver of the first media device, the first set of user-selectable options output to a first display of the first media device;
   receive a communication from the first media device, wherein the communication includes search parameters to be used to perform a correlation of the program ratings of the first subscriber and other program ratings of a plurality of other subscribers of the social networking service;
   correlate the program ratings of the first subscriber with the other program ratings of the plurality of other subscribers using the search parameters included in the communication received from the first subscriber;
   generate a candidate member list for the first subscriber based on the correlation of the program ratings and the other program ratings, the candidate member list comprising information of a subset of the plurality of other subscribers identified based on the correlation of the program ratings, and the generating the candidate member list comprising forming the information of the subset at least in part by anonymizing personal identifying information corresponding to the subset of the plurality of other subscribers so that the personal identifying information is excluded from the candidate member list and one or more pseudonyms are included in the candidate member list;
   cause the candidate member list to be transmitted to the first media device associated with the first subscriber for presentation with the first display along with a second set of one or more user-selectable options corresponding to one or more pseudonyms of the candidate member list;
   receive a transmission from the first media device responsive to a selection from the second set of one or more user-selectable options corresponding to the one or more pseudonyms of the candidate member list;
   consequent to the transmission, cause an invite-to-join message to be transmitted to a second television receiver associated with a second subscriber from the subset of the plurality of other subscribers so that a third set of one or more user-selectable options corresponding to the invite-to-join message is displayed on a second display communicably coupled with the second television receiver to facilitate the second subscriber joining a social network associated with the first subscriber;
   when the invite-to-join message is accepted via the third set of one or more user-selectable options, causing the second subscriber to be added to the social network associated with the first subscriber, and providing hosting for one or more social network service subscribers on a network member list of the first subscriber;
   when the invite-to-join message is not accepted via the third set of one or more user-selectable options, not causing the second subscriber to be added to the social network associated with the first subscriber;

expose an organized list of program ratings associated with the first subscriber via an interface of the social networking service to allow editing of the organized list of program ratings associated with the first subscriber, and when, in response to the exposing of the organized list of program ratings associated with the first subscriber via the interface, a transmission is received from a second media device to edit the organized list of program ratings associated with the first subscriber, editing the organized list of program ratings associated with the first subscriber to create a second list of program ratings organized according to one or more different categories accessible via the social networking service; and based on the second list of program ratings associated with the first subscriber, cause a second invite-to-join message to be transmitted to a communication device associated with the first subscriber and/or a third subscriber.

2. The system of claim 1, wherein the communication received from the first subscriber includes instructions which cause the social networking service to reserve part of the non-transitory storage media for storage of a social network associated to the first subscriber, and to perform social network hosting services.

3. The system of claim 1, wherein the program ratings of the first subscriber are organized according to categories selected by the first subscriber.

4. The system of claim 3, wherein the search parameters used for the correlation of the program ratings of the first subscriber with the program ratings of the plurality of other subscribers include restricting the correlation to within one or more categories of the program ratings of the first subscriber.

5. The system of claim 1, wherein, responsive to the television service provider receiving an invitee member list from at least one transmitter-receiver of the first subscriber, the instructions cause an invite-to-join message to be transmitted to at least one transmitter-receiver associated with a second subscriber on the invitee member list.

6. The system of claim 5, wherein, upon reception by the television service provider of an accept message from at least one transmitter-receiver associated with the second subscriber, the instructions cause information about the second subscriber to be added to a network member list in a social network of the first subscriber and social network services pertaining to the social network of the first subscriber to be provided for the second subscriber.

7. The system of claim 5, wherein, upon reception by the television service provider of a rejection message from at least one transmitter-receiver associated with the second subscriber, the instructions cause one or more social network services not to be provided for the second subscriber.

8. The system of claim 5, wherein, upon not receiving by the television service provider a response message from at least one transmitter-receiver associated with the second subscriber, the instructions cause one or more social network services not to be provided for the second subscriber.

9. A method for providing a social networking service by a television service provider, the method comprising:

transmitting television broadcast content from a communications and operations subsystem of the television service provider to a plurality of subscriber television receivers;

receiving a communication at the communications and operations subsystem of the television service provider from a first subscriber of the social networking service, wherein the communication includes search parameters to be used to perform a correlation of program ratings of the first subscriber and a plurality of other subscribers of the social networking service;

correlating the program ratings of the first subscriber with the program ratings of the plurality of other subscribers of the social networking service using the search parameters included in the communication received from the first subscriber;

generating a candidate member list for the first subscriber, wherein the candidate member list comprises information of a subset of the plurality of other subscribers, and the subset of the plurality of other subscribers is based on the correlation of the program ratings, and the generating the candidate member list comprising forming the information of the subset at least in part by anonymizing personal identifying information corresponding to the subset of the plurality of other subscribers so that the personal identifying information is excluded from the candidate member list and one or more pseudonyms are included in the candidate member list;

transmitting the candidate member list to at least one transmitter-receiver associated with the first subscriber;

receive a transmission from the at least one transmitter-receiver responsive to a selection from one or more user-selectable options corresponding to the one or more pseudonyms of the candidate member list;

consequent to the transmission, cause an invite-to-join message to be transmitted to a second transmitter-receiver associated with a second subscriber from the subset of the plurality of other subscribers so that a set of one or more user-selectable options corresponding to the invite-to-join message is displayed on a second display communicably coupled with the second transmitter-receiver to facilitate the second subscriber joining a social network associated with the first subscriber;

when the invite-to-join message is accepted via a third set of one or more user-selectable options, cause the second subscriber to be added to the social network associated with the first subscriber, and provide hosting for one or more social network service subscribers on a network member list of the first subscriber;

when the invite-to-join message is not accepted via the third set of one or more user-selectable options, not cause the second subscriber to be added to the social network associated with the first subscriber;

expose an organized list of program ratings associated with the first subscriber via an interface of the social networking service to allow editing of the organized list of program ratings associated with the first subscriber, and when, in response to the exposing of the organized list of program ratings associated with the first subscriber via the interface, a transmission is received from a second media device to edit the organized list of program ratings associated with the first subscriber, editing the organized list of program ratings associated with the first subscriber to create a second list of program ratings organized according to one or more different categories accessible via the social networking service; and based on the second list of program ratings associated with the first subscriber, cause a second invite-to-loin message to be transmitted to a communication device associated with the first subscriber and/or a third subscriber.

10. The method of claim 9, wherein the communication received from the first subscriber includes instructions for the social networking service to reserve a part of a non-transitory storage media for storage of a social network associated to the first subscriber, and to perform social network hosting services.

11. The method of claim 9, wherein the program ratings of the first subscriber are organized according to categories selected by the first subscriber.

12. The method of claim 11, wherein the search parameters used for the correlation of the program ratings of the first subscriber with the program ratings of the plurality of other subscribers include restricting the correlation to within one or more categories of the program ratings of the first subscriber.

13. The method of claim 9, wherein responsive to the television service provider receiving an invitee member list from at least one transmitter-receiver of the first subscriber, transmitting by the television service provider an invite-to-join message to at least one transmitter-receiver associated with a second subscriber on the invitee member list.

14. The method of claim 13, wherein responsive to the television service provider receiving an accept message from at least one transmitter-receiver associated with the second subscriber, adding information about the second subscriber to a network member list in a social network of the first subscriber and providing social network services pertaining to the social network of the first subscriber for the second subscriber.

15. The method of claim 13, wherein upon reception by the television service provider of a rejection message from at least one transmitter-receiver associated with the second subscriber, not providing one or more social network services for the second subscriber.

16. The method of claim 13, wherein upon not receiving by the television service provider a response message from at least one transmitter-receiver associated with the second subscriber, not providing one or more social network services for the second subscriber.

17. A method, comprising:

receiving a communication from a first subscriber of a social networking service comprising search parameters to be used to perform a correlation of program ratings of the first subscriber and a plurality of other subscribers of the social networking service;

correlating the program ratings of the first subscriber with the program ratings of the plurality of other subscribers of the social networking service using the search parameters included in the communication received from the first subscriber;

generating a candidate member list for the first subscriber comprising information of a subset of the plurality of other subscribers, wherein the subset of the plurality of other subscribers is based on the correlation of the program ratings, and the generating the candidate member list comprising forming the information of the subset at least in part by anonymizing personal identifying information corresponding to the subset of the plurality of other subscribers so that the personal identifying information is excluded from the candidate member list and one or more pseudonyms are included in the candidate member list;

transmitting the candidate member list to at least one transmitter-receiver associated with the first subscriber;

receive a transmission from the at least one transmitter-receiver responsive to a selection from one or more user-selectable options corresponding to the one or more pseudonyms of the candidate member list;

consequent to the transmission, cause an invite-to-join message to be transmitted to a second transmitter-receiver associated with a second subscriber from the subset of the plurality of other subscribers so that a set of one or more user-selectable options corresponding to the invite-to-join message is displayed on a second display communicably coupled with the second transmitter-receiver to facilitate the second subscriber joining a social network associated with the first subscriber;

when the invite-to-join message is accepted via a third set of one or more user-selectable options, cause the second subscriber to be added to the social network associated with the first subscriber, and provide hosting for one or more social network service subscribers on a network member list of the first subscriber;

when the invite-to-join message is not accepted via the third set of one or more user-selectable options, not cause the second subscriber to be added to the social network associated with the first subscriber;

expose an organized list of program ratings associated with the first subscriber via an interface of the social networking service to allow editing of the organized list of program ratings associated with the first subscriber, and when, in response to the exposing of the organized list of program ratings associated with the first subscriber via the interface, a transmission is received from a second media device to edit the organized list of program ratings associated with the first subscriber, editing the organized list of program ratings associated with the first subscriber to create a second list of program ratings organized according to one or more different categories accessible via the social networking service; and based on the second list of program ratings associated with the first subscriber, cause a second invite-to-loin message to be transmitted to a communication device associated with the first subscriber and/or a third subscriber.

18. The method of claim 17, further comprising:

reserving part of a non-transitory storage media for storage of a social network associated to the first subscriber; and performing social network hosting services.

19. The method of claim 17, further comprising:

responsive to a television service provider receiving an invitee member list from at least one transmitter-receiver of the first subscriber, causing an invite-to-join message to be transmitted to at least one transmitter-receiver associated with a second subscriber on the invitee member list.

20. The method of claim 19, further comprising:

upon reception by the television service provider of an accept message from the at least one transmitter-receiver associated with the second subscriber, causing the information about the second subscriber to be added to a network member list in the social network of the first subscriber and social networking services pertaining to the social network of the first subscriber to be provided to the second subscriber.

\* \* \* \* \*

UNITED STATES PATENT AND TRADEMARK OFFICE
CERTIFICATE OF CORRECTION

PATENT NO. : 10,142,700 B2
APPLICATION NO. : 13/834916
DATED : November 27, 2018
INVENTOR(S) : Carlos Garcia Navarro Page 1 of 1

It is certified that error appears in the above-identified patent and that said Letters Patent is hereby corrected as shown below:

In the Claims

In Column 19, Line 5, delete "loin" and insert -- join --

In Column 20, Line 45, delete "loin" and insert -- join --

Signed and Sealed this
Twenty-eighth Day of April, 2020

Andrei Iancu
*Director of the United States Patent and Trademark Office*